United States Patent
Arimoto et al.

(10) Patent No.: US 7,515,198 B2
(45) Date of Patent: Apr. 7, 2009

(54) FOCUSING CONTROLLING DEVICE

(75) Inventors: Akira Arimoto, Tokyo (JP); Koichi Sato, Tokyo (JP)

(73) Assignee: Hoya Corporation, Tokyo (JP)

( * ) Notice: Subject to any disclaimer, the term of this patent is extended or adjusted under 35 U.S.C. 154(b) by 484 days.

(21) Appl. No.: 11/275,415

(22) Filed: Dec. 30, 2005

(65) Prior Publication Data

US 2006/0146173 A1    Jul. 6, 2006

(30) Foreign Application Priority Data

Jan. 5, 2005    (JP) .............................. 2005-000764

(51) Int. Cl.
*G03B 13/00*    (2006.01)
*H04N 5/232*    (2006.01)

(52) U.S. Cl. ..................... 348/345; 348/347; 396/91

(58) Field of Classification Search ................ 348/335, 348/345–357, 360; 382/255, 266–269; 396/436, 396/529, 60, 89, 91–93, 121–124
See application file for complete search history.

(56) References Cited

U.S. PATENT DOCUMENTS

| | | | | |
|---|---|---|---|---|
| 5,070,350 A | * | 12/1991 | Harvey | ......................... 396/60 |
| 5,347,340 A | * | 9/1994 | Tsukada | ....................... 396/93 |
| 6,327,440 B1 | * | 12/2001 | Taniguchi et al. | ............ 396/436 |
| 6,859,619 B2 | | 2/2005 | Kurosawa | |
| 7,394,943 B2 | * | 7/2008 | Kinney et al. | ................ 382/255 |
| 2005/0280734 A1 | | 12/2005 | Nakahara | |
| 2005/0280735 A1 | | 12/2005 | Nakahara | |
| 2006/0028574 A1 | * | 2/2006 | Lee | ............................ 348/345 |
| 2006/0198632 A1 | * | 9/2006 | Kingetsu | ..................... 396/529 |
| 2006/0291844 A1 | * | 12/2006 | Kakkori | ........................ 396/89 |

FOREIGN PATENT DOCUMENTS

| | | | |
|---|---|---|---|
| JP | 2003-121913 | * | 4/2003 |
| JP | 2003-163826 | * | 6/2003 |

* cited by examiner

*Primary Examiner*—Tuan V Ho
*Assistant Examiner*—Dennis Hogue
(74) *Attorney, Agent, or Firm*—Greenblum & Bernstein, P.L.C.

(57) ABSTRACT

A focusing controlling device is for a camera having a photographing lens and an imaging surface. The focusing controlling device includes a focus adjuster that adjusts a focus position of the photographing lens based on field curvature data. The field curvature data indicates a field curvature ratio which is a ratio of a distance between an image point of light transmitted through the photographing lens and the imaging surface to a focal distance of the photographing lens, the field curvature data being set for a partial area of the imaging surface as an average value of the field curvature ratios for the partial area.

21 Claims, 16 Drawing Sheets

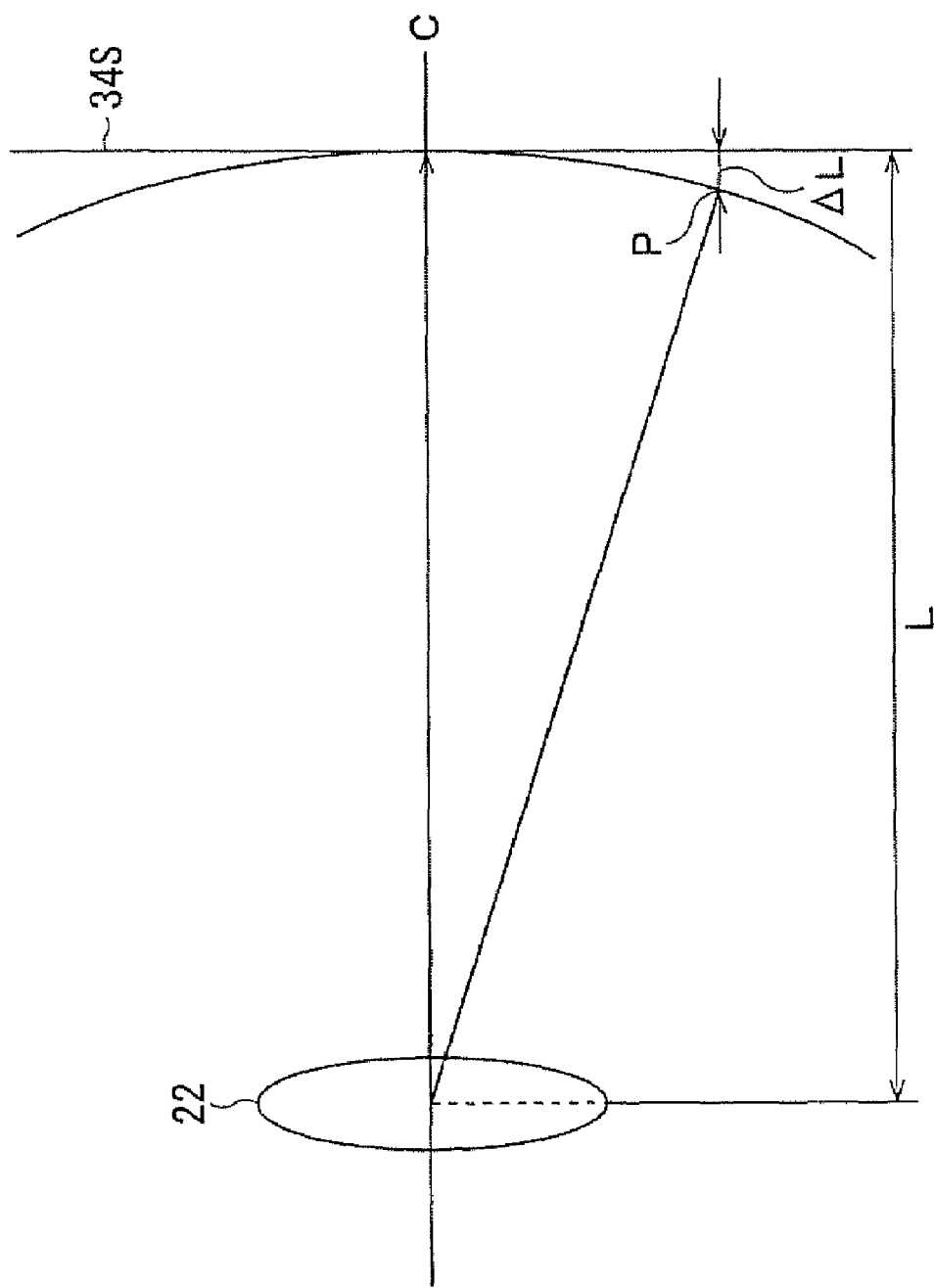

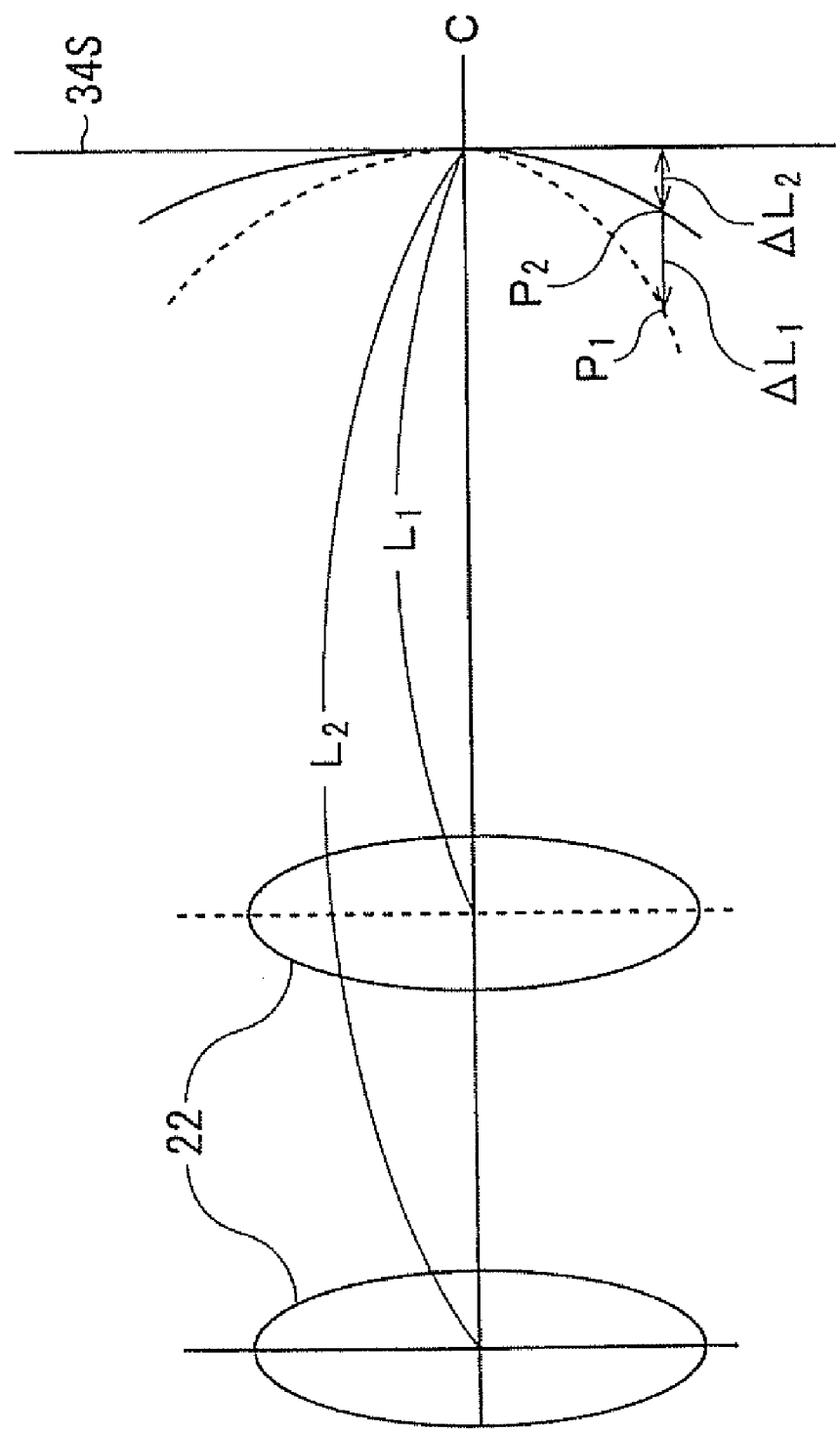

FIG. 7A

| -6 | -5 | -4 | -3 | -2 | -2 | -2 | -3 | -4 | -5 | -6 |
|---|---|---|---|---|---|---|---|---|---|---|
| -5 | -4 | -3 | -2 | -1 | -1 | -1 | -2 | -3 | -4 | -5 |
| -4 | -3 | -2 | -1 | 0 | 0 | 0 | -1 | -2 | -3 | -4 |
| -3 | -2 | -1 | 0 | 0 | 0 | 0 | 0 | -1 | -2 | -3 |
| -2 | -1 | 0 | 0 | 0 | 0 | 0 | 0 | 0 | -1 | -2 |
| -2 | -1 | 0 | 0 | 0 | 0 | 0 | 0 | 0 | -1 | -2 |
| -2 | -1 | 0 | 0 | 0 | 0 | 0 | 0 | 0 | -1 | -2 |
| -3 | -2 | -1 | 0 | 0 | 0 | 0 | 0 | -1 | -2 | -3 |
| -4 | -3 | -2 | -1 | 0 | 0 | 0 | -1 | -2 | -3 | -4 |
| -5 | -4 | -3 | -2 | -1 | -1 | -1 | -2 | -3 | -4 | -5 |
| -6 | -5 | -4 | -3 | -2 | -2 | -2 | -3 | -4 | -5 | -6 | f=28mm, F=2

AVERAGE VALUE
−1.88(%)

FIG. 7B

| -5 | -4 | -3 | -2 | -1 | 0 | -1 | -2 | -3 | -4 | -5 |
|---|---|---|---|---|---|---|---|---|---|---|
| -4 | -3 | -2 | -1 | 0 | 0 | 0 | -1 | -2 | -3 | -4 |
| -3 | -2 | -1 | 0 | 0 | 0 | 0 | 0 | -1 | -2 | -3 |
| -2 | -1 | 0 | 0 | 0 | 0 | 0 | 0 | 0 | -1 | -2 |
| -1 | 0 | 0 | 0 | 0 | 0 | 0 | 0 | 0 | 0 | -1 |
| 0 | 0 | 0 | 0 | 0 | 0 | 0 | 0 | 0 | 0 | 0 |
| -1 | 0 | 0 | 0 | 0 | 0 | 0 | 0 | 0 | 0 | -1 |
| -2 | -1 | 0 | 0 | 0 | 0 | 0 | 0 | 0 | -1 | -2 |
| -3 | -2 | -1 | 0 | 0 | 0 | 0 | 0 | -1 | -2 | -3 |
| -4 | -3 | -2 | -1 | 0 | 0 | 0 | -1 | -2 | -3 | -4 |
| -5 | -4 | -3 | -2 | -1 | 0 | -1 | -2 | -3 | -4 | -5 | f=50mm, F=2

AVERAGE VALUE
−1.16(%)

FIG. 7C

| -4 | -3 | -2 | -1 | 0 | 0 | 0 | -1 | -2 | -3 | -4 |
|---|---|---|---|---|---|---|---|---|---|---|
| -3 | -2 | -1 | 0 | 0 | 0 | 0 | 0 | -1 | -2 | -3 |
| -2 | -1 | 0 | 0 | 0 | 0 | 0 | 0 | 0 | -1 | -2 |
| -1 | 0 | 0 | 0 | 0 | 0 | 0 | 0 | 0 | 0 | -1 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| -1 | 0 | 0 | 0 | 0 | 0 | 0 | 0 | 0 | 0 | -1 |
| -2 | -1 | 0 | 0 | 0 | 0 | 0 | 0 | 0 | -1 | -2 |
| -3 | -2 | -1 | 0 | 0 | 0 | 0 | 0 | -1 | -2 | -3 |
| -4 | -3 | -2 | -1 | 0 | 0 | 0 | -1 | -2 | -3 | -4 | f=100mm, F=2

AVERAGE VALUE
−0.66(%)

FIG. 8A

|    |    |    |    |    |   |    |    |    |    |    |
|----|----|----|----|----|---|----|----|----|----|----|
| -5 | -4 | -3 | -2 | -1 | 0 | -1 | -2 | -3 | -4 | -5 |
| -4 | -3 | -2 | -1 | 0  | 0 | 0  | -1 | -2 | -3 | -4 |
| -3 | -2 | -1 | 0  | 0  | 0 | 0  | 0  | -1 | -2 | -3 |
| -2 | -1 | 0  | 0  | 0  | 0 | 0  | 0  | 0  | -1 | -2 |
| -1 | 0  | 0  | 0  | 0  | 0 | 0  | 0  | 0  | 0  | -1 |
| 0  | 0  | 0  | 0  | 0  | 0 | 0  | 0  | 0  | 0  | 0  |
| -1 | 0  | 0  | 0  | 0  | 0 | 0  | 0  | 0  | 0  | -1 |
| -2 | -1 | 0  | 0  | 0  | 0 | 0  | 0  | 0  | -1 | -2 |
| -3 | -2 | -1 | 0  | 0  | 0 | 0  | 0  | -1 | -2 | -3 |
| -4 | -3 | -2 | -1 | 0  | 0 | 0  | -1 | -2 | -3 | -4 |
| -5 | -4 | -3 | -2 | -1 | 0 | -1 | -2 | -3 | -4 | -5 | f=28mm, F=5.6

AVERAGE VALUE
−1.16(%)

FIG. 8B

|    |    |    |    |    |   |   |    |    |    |    |
|----|----|----|----|----|---|---|----|----|----|----|
| -4 | -3 | -2 | -1 | 0  | 0 | 0 | -1 | -2 | -3 | -4 |
| -3 | -2 | -1 | 0  | 0  | 0 | 0 | 0  | -1 | -2 | -3 |
| -2 | -1 | 0  | 0  | 0  | 0 | 0 | 0  | 0  | -1 | -2 |
| -1 | 0  | 0  | 0  | 0  | 0 | 0 | 0  | 0  | 0  | -1 |
| 0  | 0  | 0  | 0  | 0  | 0 | 0 | 0  | 0  | 0  | 0  |
| 0  | 0  | 0  | 0  | 0  | 0 | 0 | 0  | 0  | 0  | 0  |
| 0  | 0  | 0  | 0  | 0  | 0 | 0 | 0  | 0  | 0  | 0  |
| -1 | 0  | 0  | 0  | 0  | 0 | 0 | 0  | 0  | 0  | -1 |
| -2 | -1 | 0  | 0  | 0  | 0 | 0 | 0  | 0  | -1 | -2 |
| -3 | -2 | -1 | 0  | 0  | 0 | 0 | 0  | -1 | -2 | -3 |
| -4 | -3 | -2 | -1 | 0  | 0 | 0 | -1 | -2 | -3 | -4 | f=50mm, F=5.6

AVERAGE VALUE
−0.66(%)

FIG. 8C

|    |    |    |   |   |   |   |   |    |    |    |
|----|----|----|---|---|---|---|---|----|----|----|
| -3 | -2 | -1 | 0 | 0 | 0 | 0 | 0 | -1 | -2 | -3 |
| -2 | -1 | 0  | 0 | 0 | 0 | 0 | 0 | 0  | -1 | -2 |
| -1 | 0  | 0  | 0 | 0 | 0 | 0 | 0 | 0  | 0  | -1 |
| 0  | 0  | 0  | 0 | 0 | 0 | 0 | 0 | 0  | 0  | 0  |
| 0  | 0  | 0  | 0 | 0 | 0 | 0 | 0 | 0  | 0  | 0  |
| 0  | 0  | 0  | 0 | 0 | 0 | 0 | 0 | 0  | 0  | 0  |
| 0  | 0  | 0  | 0 | 0 | 0 | 0 | 0 | 0  | 0  | 0  |
| 0  | 0  | 0  | 0 | 0 | 0 | 0 | 0 | 0  | 0  | 0  |
| -1 | 0  | 0  | 0 | 0 | 0 | 0 | 0 | 0  | 0  | -1 |
| -2 | -1 | 0  | 0 | 0 | 0 | 0 | 0 | 0  | -1 | -2 |
| -3 | -2 | -1 | 0 | 0 | 0 | 0 | 0 | -1 | -2 | -3 | f=100mm, F=5.6

AVERAGE VALUE
−0.33(%)

FIG. 9A

| -4 | -3 | -2 | -1 | 0 | 0 | 0 | -1 | -2 | -3 | -4 |
|---|---|---|---|---|---|---|---|---|---|---|
| -3 | -2 | -1 | 0 | 0 | 0 | 0 | 0 | -1 | -2 | -3 |
| -2 | -1 | 0 | 0 | 0 | 0 | 0 | 0 | 0 | -1 | -2 |
| -1 | 0 | 0 | 0 | 0 | 0 | 0 | 0 | 0 | 0 | -1 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| -1 | 0 | 0 | 0 | 0 | 0 | 0 | 0 | 0 | 0 | -1 |
| -2 | -1 | 0 | 0 | 0 | 0 | 0 | 0 | 0 | -1 | -2 |
| -3 | -2 | -1 | 0 | 0 | 0 | 0 | 0 | -1 | -2 | -3 |
| -4 | -3 | -2 | -1 | 0 | 0 | 0 | -1 | -2 | -3 | -4 | f=28mm、F=11

AVERAGE VALUE −0.66(%)

FIG. 9B

| -3 | -2 | -1 | 0 | 0 | 0 | 0 | 0 | -1 | -2 | -3 |
|---|---|---|---|---|---|---|---|---|---|---|
| -2 | -1 | 0 | 0 | 0 | 0 | 0 | 0 | 0 | -1 | -2 |
| -1 | 0 | 0 | 0 | 0 | 0 | 0 | 0 | 0 | 0 | -1 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| -1 | 0 | 0 | 0 | 0 | 0 | 0 | 0 | 0 | 0 | -1 |
| -2 | -1 | 0 | 0 | 0 | 0 | 0 | 0 | 0 | -1 | -2 |
| -3 | -2 | -1 | 0 | 0 | 0 | 0 | 0 | -1 | -2 | -3 | f=50mm、F=11

AVERAGE VALUE −0.33(%)

FIG. 9C

| -2 | -1 | 0 | 0 | 0 | 0 | 0 | 0 | 0 | -1 | -2 |
|---|---|---|---|---|---|---|---|---|---|---|
| -1 | 0 | 0 | 0 | 0 | 0 | 0 | 0 | 0 | 0 | -1 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| -1 | 0 | 0 | 0 | 0 | 0 | 0 | 0 | 0 | 0 | -1 |
| -2 | -1 | 0 | 0 | 0 | 0 | 0 | 0 | 0 | -1 | -2 | f=100mm、F=11

AVERAGE VALUE −0.10(%)

FOCUSING CONTROLLING DEVICE

BACKGROUND OF THE INVENTION

1. Field of the Invention

The present invention relates to a focusing controlling device of a camera, and especially relates to a focusing controlling device which adjusts a focus position of a lens according to the performance thereof.

2. Description of the Related Art

In automatic focusing cameras, when focusing on the center of the photographing area, the periphery of the photographing area can be remarkably out of focus, due to the field curvature of the photographing lens. Therefore, a single-lens reflex camera where a focus position is adjustable based on the field curvature information unique to the photographing lens, is known. In this camera, based on the field curvature information previously stored in a storage medium in the lens barrel, the standard position for focusing is shifted from the center to the periphery of the photographing area, so that images having larger in focus area are obtained.

The field curvature of lens varies due to the aperture value and so on, therefore, adjusting a focus position based only on the field curvature information unique to the photographing lens, is not enough to set a suitable focus position. On the other hand, in current cameras which can automatically adjust the standard point for focusing, how far the standard point should be shifted from the center to the periphery of the photographing area, according to the subject situation and so on, is not adjustable.

SUMMARY OF THE INVENTION

Therefore, an object of the present invention is to provide a focusing controlling device which can set a suitable focus position based on a field curvature performance and so on of the photographing lens, and further, which can adjust the standard position for focusing to the preferred position.

A focusing controlling device according to the present invention, is for a camera having a photographing lens and an imaging surface. The focusing controlling device includes a focus adjuster that adjusts a focus position of the photographing lens based on field curvature data. The field curvature data indicates a field curvature ratio which is a ratio of a distance between an image point of light transmitted through the photographing lens and the imaging surface, to a focal distance of the photographing lens, the field curvature data being set for a partial area of the imaging surface as an average value of the field curvature ratios for the partial area.

A camera according to the present invention, includes a photographing lens, an imaging surface; and a focus adjuster that adjusts a focus position of the photographing lens based on field curvature data. The field curvature data indicates a field curvature ratio which is a ratio of a distance between an image point of light transmitted through the photographing lens and the imaging surface, to a focal distance of the photographing lens, the field curvature data being set for a partial area of the imaging surface as an average value of the field curvature ratios for the partial area.

A photographing lens focus position adjusting method according to the present invention, includes a field curvature data calculating step and a focus adjusting step. In the field curvature data calculating step, field curvature data indicating a field curvature ratio which is a ratio of a distance between an image point of light transmitted through the photographing lens and an imaging surface, to a focal distance of the photographing lens, and which is set for a partial area of the imaging surface, is calculated by averaging the field curvature ratios for the partial area. In the focus adjusting step, a focus position of the photographing lens is adjusted based on the field curvature data.

BRIEF DESCRIPTION OF THE DRAWINGS

The present invention will be better understood from the description of the preferred embodiments of the invention set forth below together with the accompanying drawings, in which:

FIG. 5 is a conceptual view representing a defocused area caused by field curvature of the photographing lens;

FIG. 6 is a conceptual view representing a defocused area caused by field curvatures being different due to focal distances;

FIG. 7 is a view representing examples of lens data for different focal distances for a first aperture value;

FIG. 8 is a view representing examples of lens data for different focal distances for a second aperture value;

FIG. 9 is a view representing examples of lens data for different focal distances for a third aperture value;

DESCRIPTION OF THE PREFERRED EMBODIMENTS

Figure 1:
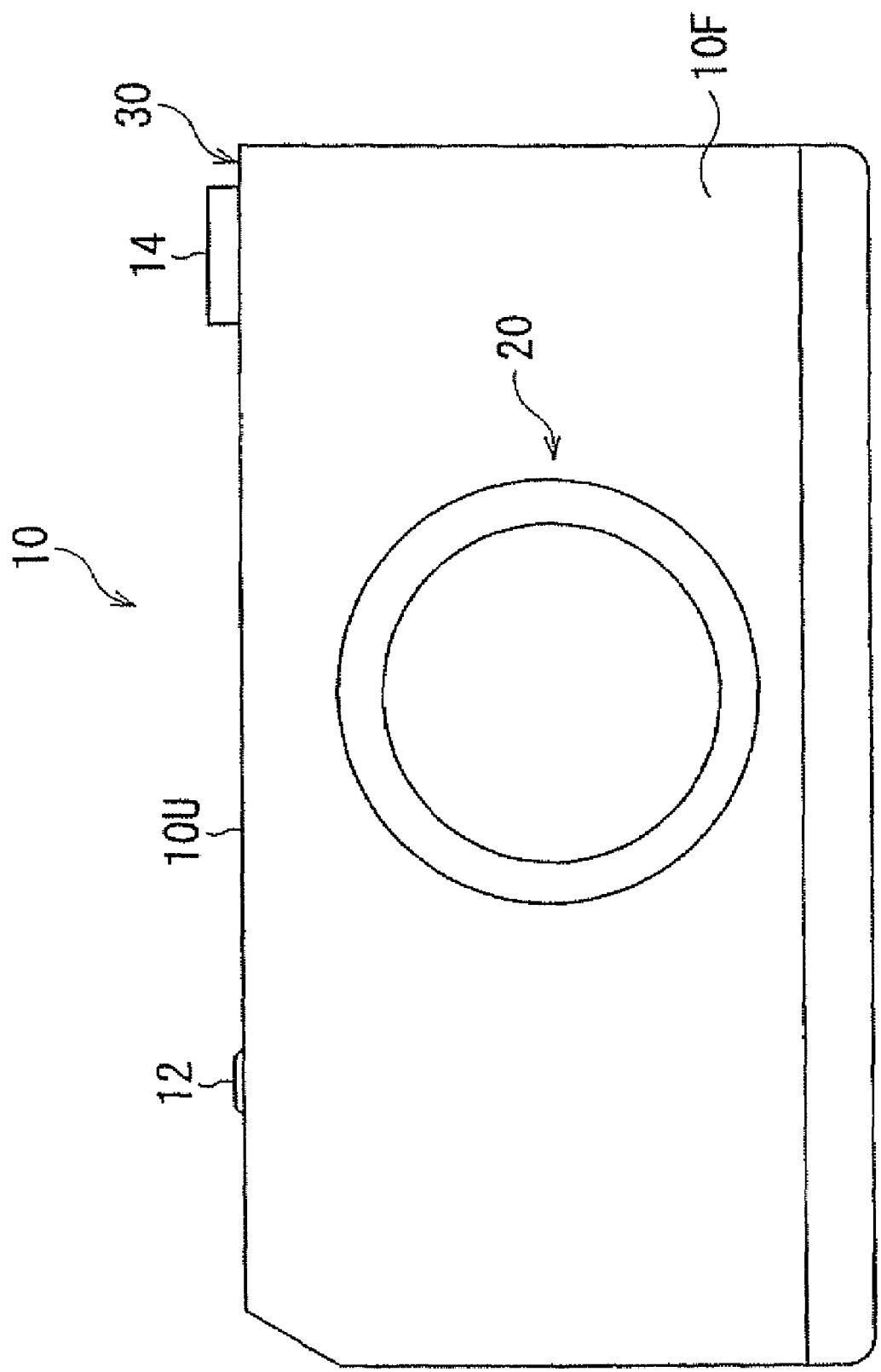
FIG. 1 is a front view of the digital single-lens reflex camera of the first embodiment.
Figure 2:
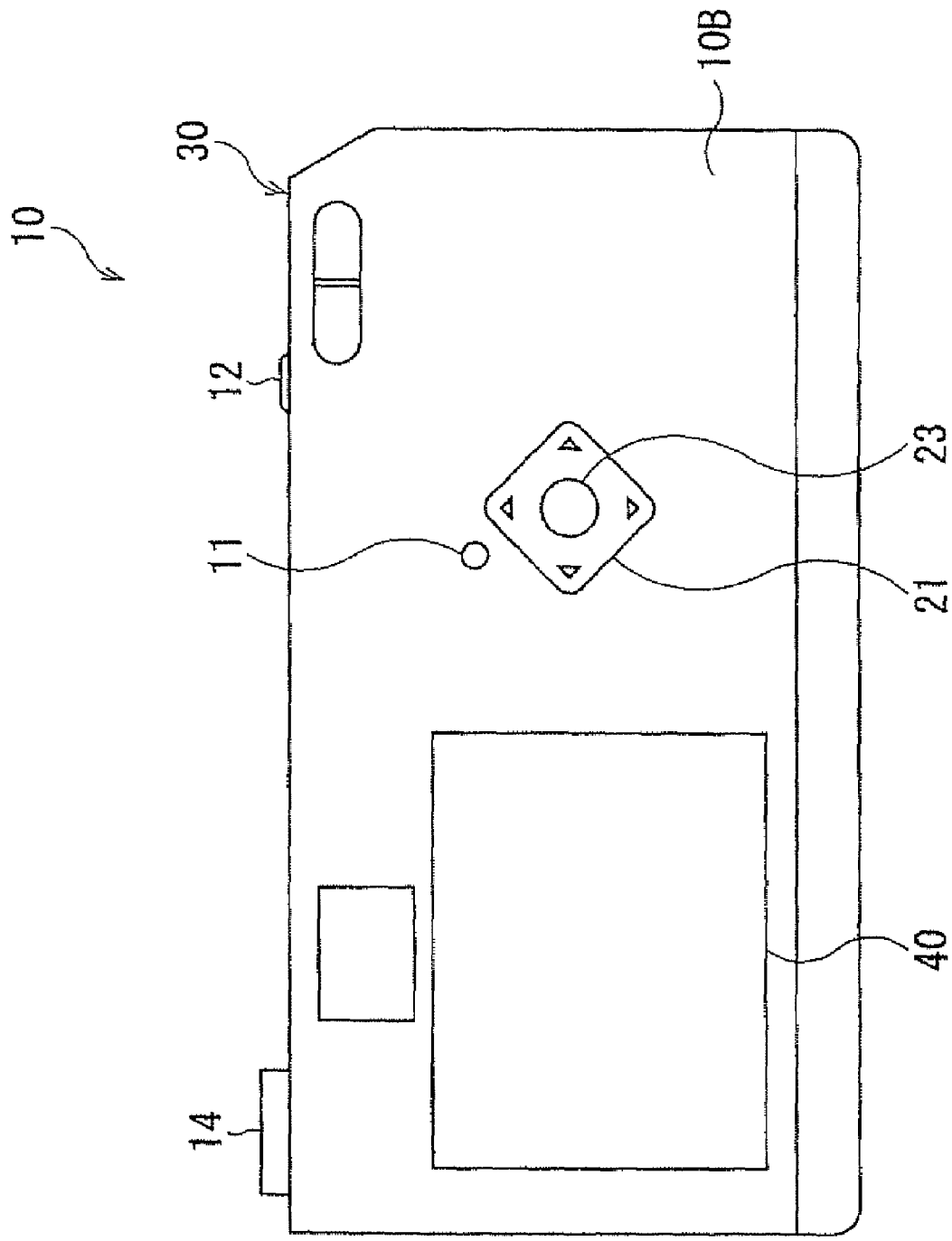
FIG. 2 is a rear view of the digital single-lens reflex camera.

Hereinafter, the preferred embodiments of the present invention are described with reference to the attached drawings. FIG. 1 is a front view of the digital single-lens reflex camera of the first embodiment. FIG. 2 is a rear view of the digital single-lens reflex camera.

A digital single-lens reflex camera 10 includes a lens unit 20 detachably attached to the front surface 10F of the digital single-lens reflex camera 10, and a camera body 30. A plurality of lens units including the lens unit 20 can be attached to the camera body 30. Some of these lens units used with the camera body 30, such as the lens unit 20, include photographing lenses (not shown) with a zoom function. On the upper surface 10U of the digital single-lens reflex camera 10, a release button 12 and a mode dial 14 are provided. Further, on the rear surface 10B of the digital single-lens reflex camera 10, an LCD 40 for displaying subject images, a menu button 11 for carrying out predetermined operations, a cross key 21, and an OK button 23 are provided (see FIG. 2).

Figure 3:
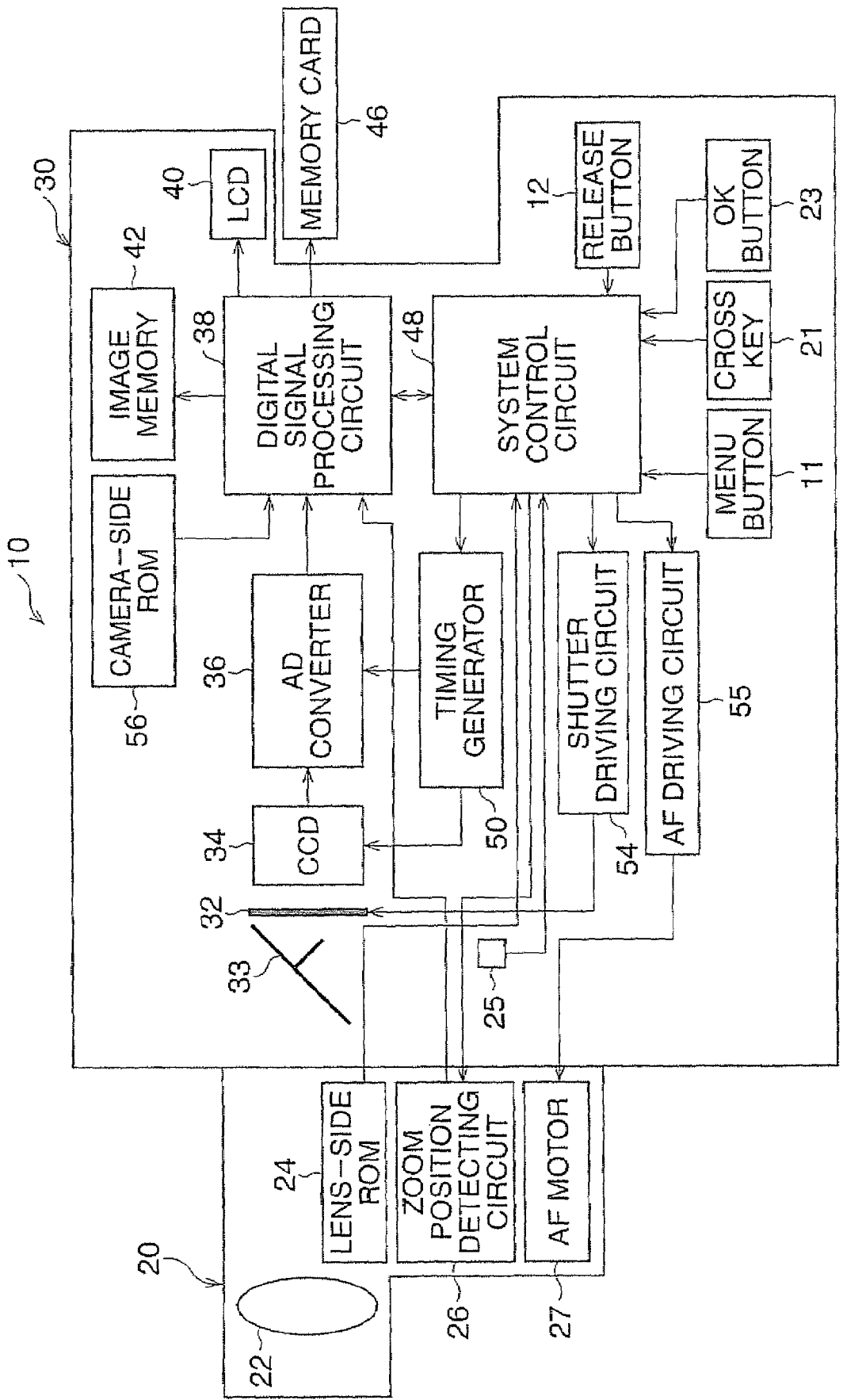
FIG. 3 is a block diagram of the digital single-lens reflex camera of the first embodiment.

FIG. 3 is a block diagram of the digital single-lens reflex camera 10 of the first embodiment.

In the camera body 30, a system control circuit 48 for controlling the whole camera body 30, is provided. The menu button 11, the cross key 21, and the OK button 23 are connected to the system control circuit 48, and predetermined signals corresponding to the button pressing operation by a user are transmitted to the system control circuit 48. A menu selection picture can be displayed on the LCD 40 by such operations, so that various modes and parameters can be selected.

The lens unit 20 has a lens-side ROM 24 in which identification data to identify the photographing lens 22 is stored, and a zoom position detecting circuit 26 which detects a zoom position data indicating the zoom position (focal distance) of the photographing lens 22, and transmits the zoom position data to the camera body 30. Further, the lens unit 20 is provided with an aperture position detecting circuit (not shown) which detects a position of an aperture of the photographing lens 22 (not shown) and transmits aperture position data indicating the position of the aperture, to the camera body 30 similarly to the zoom data, and an AF motor 27 which drives the photographing lens 22 and adjusts the zoom position of the photographing lens 22.

In the camera body 30, a CCD 34 which receives light transmitted through the photographing lens 22 and a shutter 32 to generate image signals corresponding to a subject, is provided. A part of light transmitted through the photographing lens 22 is reflected by a half mirror 33 and made incident on an AF sensor 25. When a release button 12 is half depressed and a photometry-measuring switch is turned on, the AF sensor 25 detects the contrast of the light which is made incident on its surface and transmits signals indicating the detected contrast, to the system control circuit 48. The system control circuit 48 adjusts the zoom position of the photographing lens 22 based on the received signals indicating contrast. That is, the system control circuit 48 transmits signals for controlling the AF motor 27 to an AF driving circuit 55, the AF motor 27 makes the photographing lens 22 move gradually, under the control of the AF driving circuit 55. The system control circuit 48 controls the movement of the photographing lens 22 so that of the photographing lens 22 is in the zoom position where the contrast detected by the AF sensor 25 is maximum.

The zoom position where the contrast is maximum, is the zoom position for focusing on the basis of the center of an imaging surface 34S of the CCD 34 (the position is named the standard zoom position hereinafter). The standard position can be the focus position of the photographing lens 22 at the photographing time. However, making the photographing lens 22 move to a zoom position for focusing on the basis of a peripheral area being apart from the center of the CCD 34 (the position is named the peripheral zoom position hereinafter), is also possible here for photographing, based on the field curvature data indicating a field curvature ratio of the photographing lens 22. Setting the standard zoom position or the peripheral zoom position as the focus position, that is, photographing when the photographing lens 22 is in the standard zoom position or in the peripheral zoom position after shifting from the standard zoom position, is determined by selecting a mode when the menu selection picture is displayed on the LCD 40.

The field curvature data is unique to a lens, and is stored in a camera-side ROM 56 as lookup tables in advance. In the camera-side ROM 56, the field curvature data are stored for the photographing lenses included in all the lens units they are attachable to the camera body 30, such as the lens unit 20. When the identification data is read by the system control circuit 48, the lens in the lens unit attached to the camera body 30 is identified as the photographing lens 22, and the system control circuit 48 transmits signals to show that the photographing lens 22 is being used, to a digital signal processing circuit 38. The digital signal processing circuit 38 reads field curvature data for the photographing lens 22 from the camera-side ROM 56 based on the signals from the system control circuit 48, and transmits data to the system control circuit 48. Further, the digital signal processing circuit 38 calculates corrected field curvature data for adjusting the zoom position of the photographing lens 22, according to need, based on the zoom position of the photographing lens 22 indicated by the zoom position data, and the aperture position of the aperture at the photographing time, by interpolation of the field curvature data. The digital signal processing circuit 38 transmits the corrected field curvature data, or the original field curvature data when the corrected field curvature data is not required, to the system control circuit 48.

The system control circuit 48 transmits instructing signals for adjusting the zoom position of the photographing lens 22 to the AF driving circuit 55, based on the corrected field curvature data or the original field curvature data. The photographing lens 22 is driven to the predetermined zoom position by the AF motor 27, under the control of the AF driving circuit 55. When the release button 12 is fully depressed, the aperture is driven to be in a predetermined opening position. Further, a shutter driving circuit 54 makes the shutter 32 open for a predetermined time based on the control signals from the system control circuit 48. As a result of this, the CCD 34 whose operation timing is controlled by a timing generator 50 is exposed, and image signals for indicating the subject are generated in the CCD 34.

Image signals generated by the CCD 34 are converted from analog to digital signals by an A/D converter 36. The digitalized image signals are transmitted to an image memory 42 via the digital signal processing circuit 38, and are temporally stored in the image memory 42. To the image signals, various processes such as white balance adjustment and gamma correction are carried out, and the processed image signals are stored in the memory card 46. Then an LCD 40 is driven based on the corrected image signals, and a subject image is displayed on the LCD 40.

Figure 4:
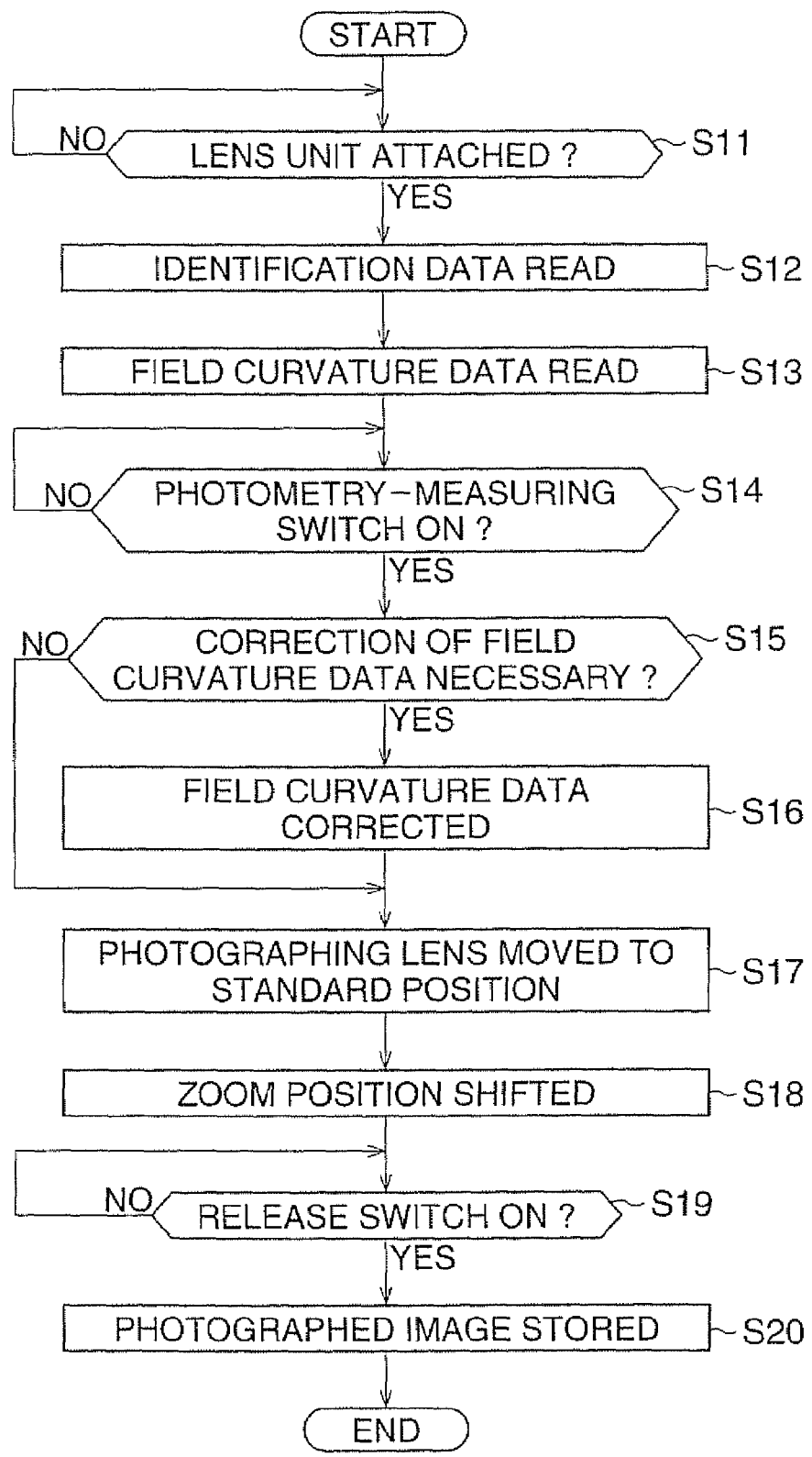
FIG. 4 is a flowchart representing a zoom position correction routine of the photographing lens of the first embodiment.

FIG. 4 is a flowchart representing a zoom position correction routine of the photographing lens 22 of the first embodiment.

The zoom position correction routine starts when a power switch (not shown) provided on the camera body 30 is turned on. At step S11, it is judged whether the lens unit 20 is attached to the camera body 30 or not. When it is judged that the lens unit 20 is attached to the camera body 30, the process proceeds to step S12. At step S12, the identification data of the photographing lens 22 is read by the system control circuit 48, and then the process proceeds to step S13. At step S13, field curvature data of the photographing lens 22 to be used, is selectively read from a plurality of field curvature data stored in the camera-side ROM 56, based on the read identification data. At step S14, it is judged whether the release button 12 is half pressed and the photometry-measuring switch is turned on or not, and when it is judged that the photometry-measuring switch is turned on, the process proceeds to step S15.

At step S15, it is judged whether the correction of the field curvature data (interpolation process) stored as lookup tables is necessary or not, by the digital signal processing circuit 38. The judgment is carried out based on the focal distance of the photographing lens 22 and the aperture position, represented by the zoom position data and the aperture position data obtained by the digital signal processing circuit 38. When it is judged that the correction of the field curvature data is necessary, the process proceeds to step S16, and when it is judged that the correction of the field curvature data is not necessary, the process proceeds to step S17.

At step S16, the field curvature data is interpolated by the digital signal processing circuit 38, based on the zoom position data and the aperture position data, the corrected field curvature data to be used for adjusting the zoom position is calculated, and then the process proceeds to step S17.

At step S17, the AF motor 27 is controlled by the AF driving circuit 55, for making the photographing lens 22 move to the standard zoom position where the output of the AF sensor 25 is maximum, and then the process proceeds to step S18. At step S18, the zoom position of the photographing lens 22 is corrected from the standard position to a focus position by being shifted the required distance, based on the field curvature data, or the corrected field curvature data, and then the process proceeds to step S19.

At step S19, it is judged whether the release button 12 is fully depressed and a release switch is turned on or not, and when it is judged that the release switch is turned on, the process proceeds to step S20. At step S20, a subject is photographed, and the obtained image is stored in the memory card 46. And then, the zoom position correction routine ends.

FIG. 5 is a conceptual view representing a defocused area caused by field curvature of the photographing lens 22. FIG. 6 is a conceptual view representing a defocused area caused by field curvatures being different due to focal distances. FIGS. 7 to 9 represent examples of the field curvature data. That is, FIG. 7 is a view representing examples of the lens data for different focal distances for a first aperture value, and FIGS. 8 and 9 are views representing examples of the lens data for different focal distances for second and third aperture values.

The defocusing might occur on a part of the photographed image, due to aberrations including the field curvature. Focus error due s to field curvature, is caused by an image point "P" of light transmitted through the photographing lens 22 not being on an imaging surface 34S of the CCD 34. Therefore, the focusing is less sharp when a differential distance "ΔL" representing a distance between the image point "P" and the imaging surface 34S of the CCD 34 is larger. This means that focus error due to field curvature, is generally larger at the peripheral areas having greater distance from the center point "C" of the imaging surface 34S. A field curvature ratio is defined as a ratio of the differential distance "ΔL", being a distance between the actual image point "P", and the imaging surface 34S of the CCD 34, to a distance "L" corresponding to the focal distance "f" of the photographing lens 22, that is, "ΔL/L". The field curvature ratio "ΔL/L" is a percentage (%) here.

The field curvature is unique to a lens, and for any lens, focus error is greater when a focal distance "f" is smaller. One reason for this is that the distance "L" corresponding to the focal distance "f" is smaller. And another reason is that when a focal distance "f" is smaller, the differential distance "ΔL" is larger. This can be explained by referring to FIG. 6 in which two comparison cases are shown. In the first case (represented by the broken line) where the focal distance is shorter, the distance corresponding to the focal distance is "$L_1$", the image point is "$P_1$", and the differential distance is "$\Delta L_1$". In the second case (represented by the solid line) where the focal distance is larger than that in the first case, the distance corresponding to the focal distance s is "$L_2$", the image point is "$P_2$", and the differential distance is "$\Delta L_2$". Comparing these two cases, the field curvature ratio "$\Delta L_1/L_1$" of the first case, is larger than that of the second case, "$\Delta L_2/L_2$". Further, focus error due to field curvature, also varies with the aperture value, and is greater when the aperture value is smaller.

Therefore, the field curvature data used for adjusting the zoom position of the photographing lens 22, are set for the focal distances "f" of the photographing lens 22 and for aperture values "F" (see FIGS. 7 to 9). The field curvature data represent average values of the field curvature ratios "ΔL/L" for a partial area of the imaging surface 34S. That is, each of the small areas divided by lines inside the tables of FIGS. 7 to 9, represents the partial area, and numbers inside the partial areas represent the average values of the field curvature ratios for each partial area.

The sign of the field curvature field curvature data, indicates whether the image point "P" of light transmitted through the photographing lens 22 is at the photographing lens 22 side of the imaging surface 34S or not. When the sign of the field curvature data is minus, the image point "P" is at the photographing lens 22 side of the imaging surface 34S, as in FIGS. 5 and 6. Therefore, for example, light transmitted through the photographing lens 22 and entering a partial area in FIG. 7(A) where the field curvature data is "–6(%)", forms an image at a point being a distance that is 6(%) of the distance "L" (corresponding to the focal distance "f"), apart from the imaging surface 34S, at the photographing lens 22 side. Light transmitted through the center of the photographing lens 22, focuses on the center point "C" of the imaging surface 34S, where the differential distance "L" is "0" (see FIGS. 5 and 6). Therefore, the field curvature data for the partial area including the center point "C" of the imaging surface 34S and surrounded by the bold line in FIGS. 7 to 9, are generally "0", and the absolute value of the field curvature data for a partial area having a longer distance from the center point "C", is larger.

Figure 10:
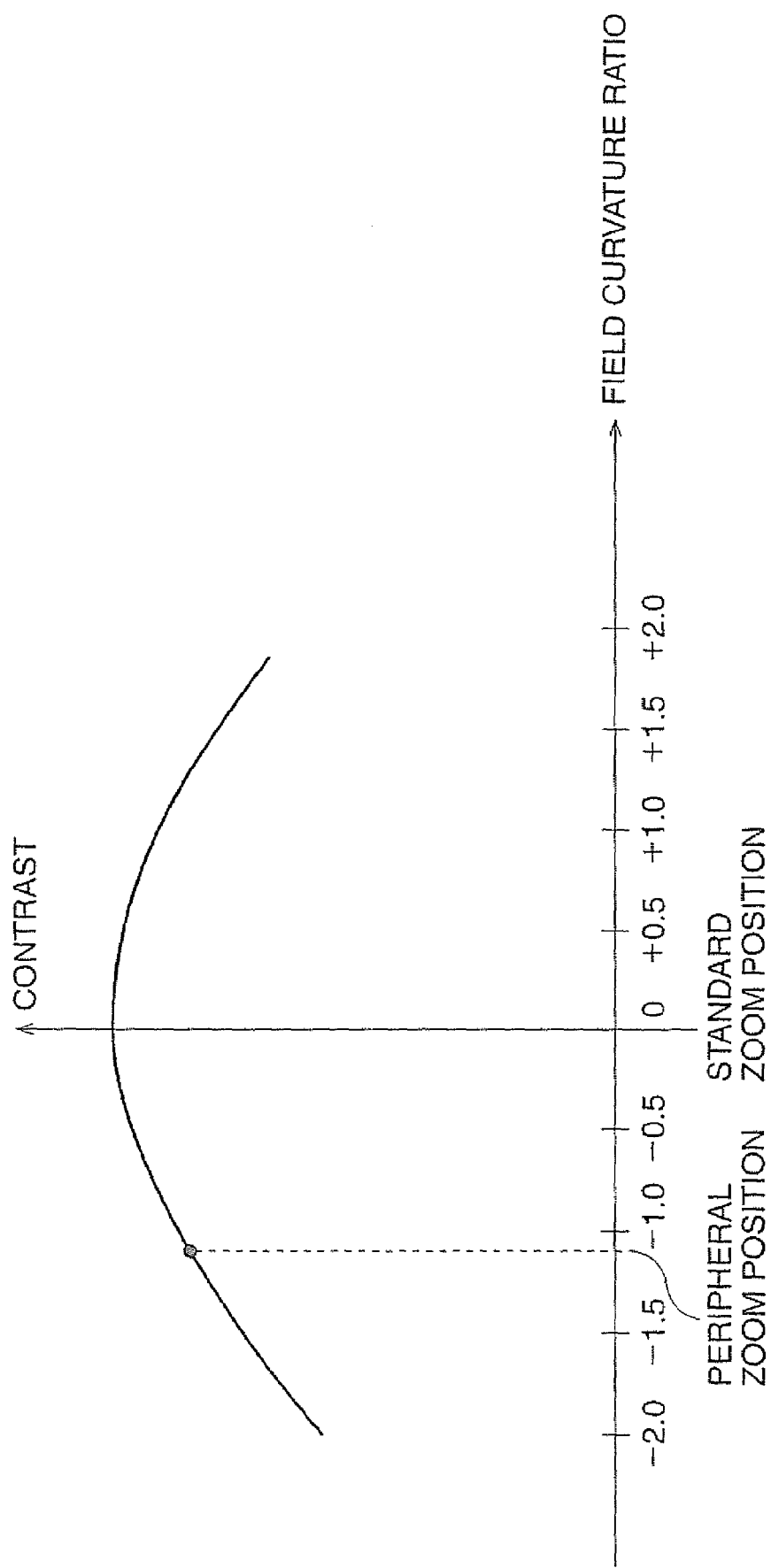
FIG. 10 is a conceptual view representing a correction of the zoom position based on field curvature data.
Figure 11:
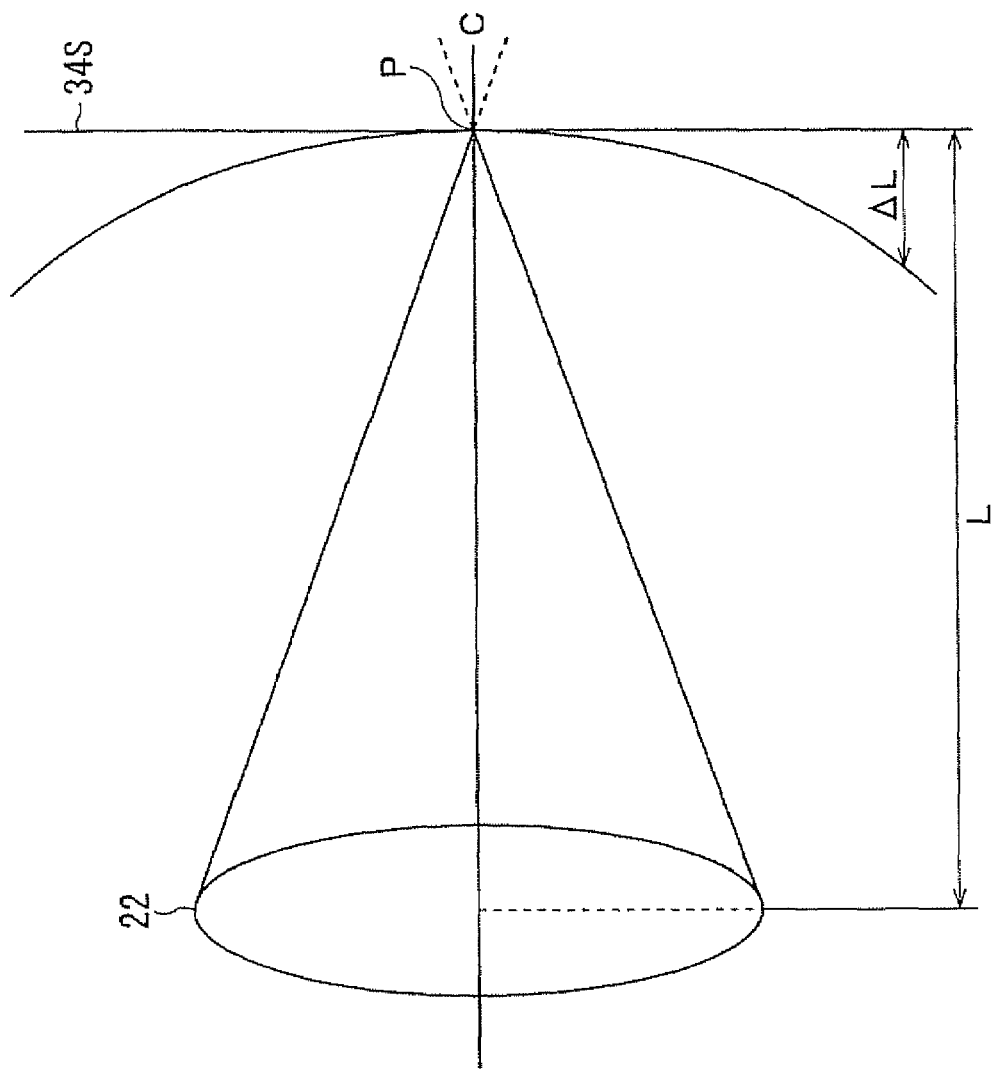
FIG. 11 represents the positions of the photographing lens and the imaging surface in a central focus mode.
Figure 12:
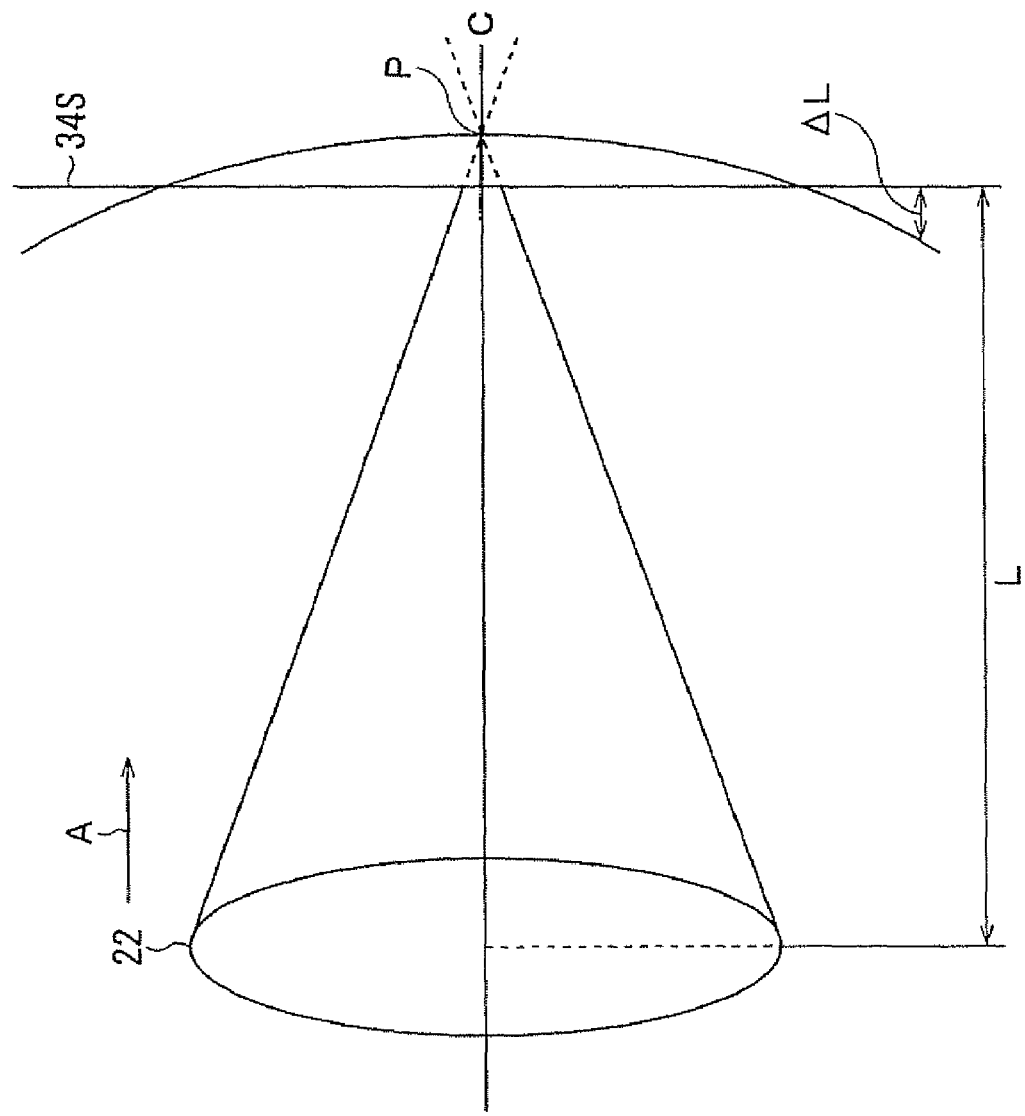
FIG. 12 represents the positions of the photographing lens and the imaging surface in an average focus mode, where the sign of field curvature data used is minus.
Figure 13:
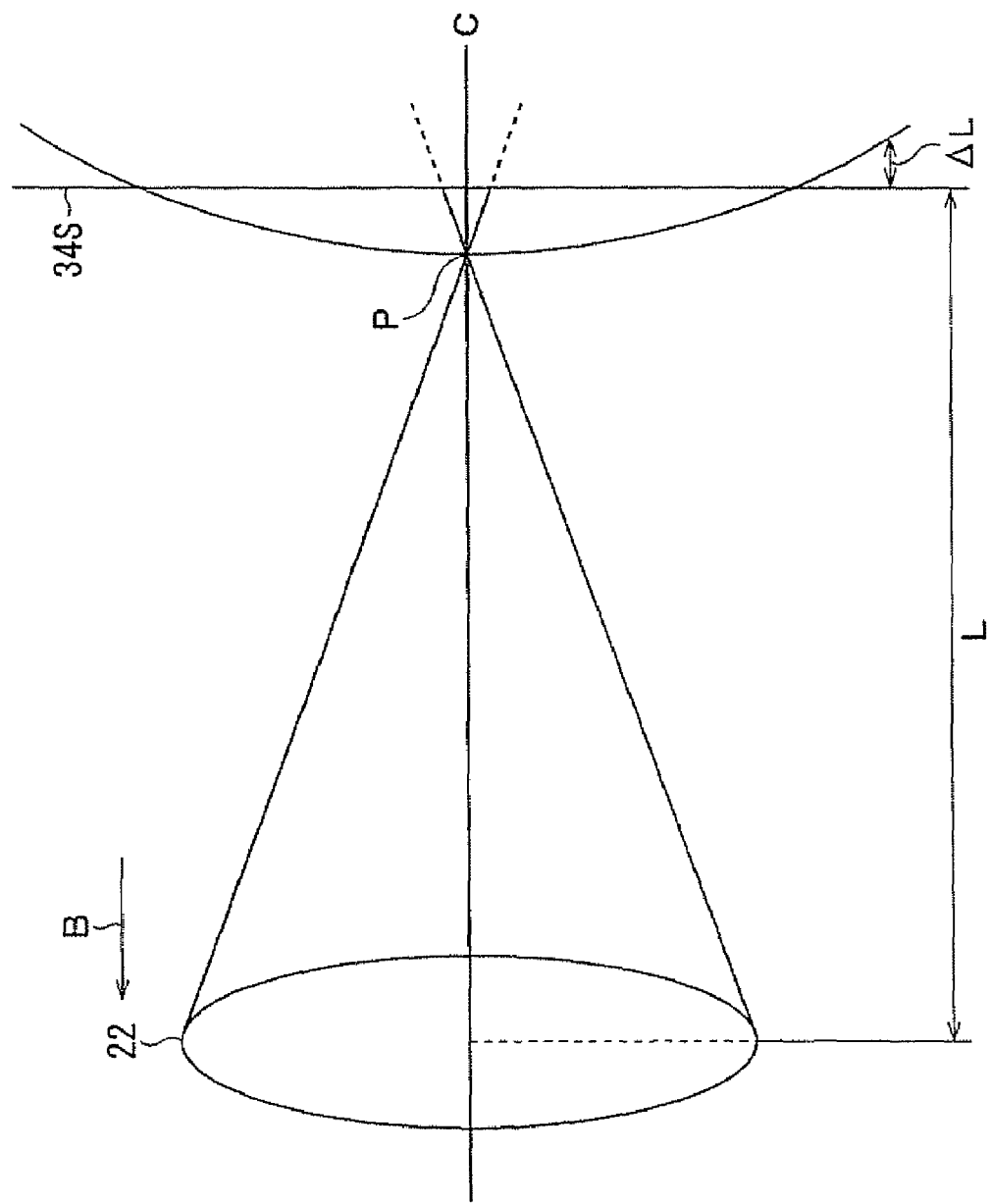
FIG. 13 represents the positions of the photographing lens and the imaging surface in an average focus mode, where the sign of field curvature data used is plus.

FIG. 10 is a conceptual view representing a correction of the zoom position based on the field curvature data. FIGS. 11 to 13 represent the positions of the photographing lens 22 and the imaging surface 34S, after the zoom position is corrected. That is, FIG. 11 represents the positions of the photographing lens 22 and the imaging surface 34S in a central focus mode, FIGS. 12 and 13 represent the positions of the photographing lens 22 and the imaging surface 34S in an average focus mode, where the sign of used field curvature data is minus in FIG. 12, and plus in FIG. 13.

The zoom position is corrected based on the field curvature data as follows. First, the photographing lens 22 is moved to the standard zoom position where the contrast detected by the AF sensor 25 is maximum. When the central focus mode where the focus position of the photographing lens 22 is determined based on the field curvature data for the partial area located in the center of the imaging surface 34S, is selected by the operation of the menu selection picture displayed on the LCD 40, the photographing lens 22 is not further moved, the standard zoom position is set as the focus position, and a subject is photographed. In this case, the differential distance "ΔL" between the image point "P" and the imaging surface 34S is larger in the peripheral area of the imaging surface 34S, as shown in FIG. 11. Therefore, the in focus area of the photographed image (a focused area) is limited to around the center, and blurriness of the image due to focusing is large at the peripheral area of the photographed image.

On the other hand, in the average focus mode where the focus position is adjusted based on an average field curvature ratio which is an average value of the field curvature ratios indicated by the field curvature data for all of the partial areas included in the imaging surface 34S, the digital signal processing circuit 38 calculates the average field curvature ratio. For example, when the field curvature data represented by FIG. 8(A) is used, the average field curvature ratio (shown as the average value in FIG. 8(A)) is "−1.16(%)". In this case, the AF driving circuit 55 controls the AF motor 27 to make the photographing lens 22 move in a direction indicated by arrow A in FIG. 12, to the peripheral zoom position, which is close to the imaging surface 34S, and a distance corresponding to 1.16(%) of the focal distance "f" of the photographing lens 22 apart from the standard zoom position.

As a result of this, the image point "P" is not on the imaging surface 34S at the center point "C" of the imaging surface 34S, and the differential distance "ΔL" between the image point "P" close to the periphery area of the imaging surface 34S and the imaging surface 34S, is smaller than the differential distance "ΔL" when the photographing lens 22 is in the standard zoom position. Therefore, the focused area is located apart from the center point "C", as a circle whose center corresponds to the center point "C", and the blurriness of the image due to focusing is reduced at the periphery area of photographed image (see FIGS. 11 and 12). As a result, there is no area where the image is seriously blurred due to focusing in the average focus mode, differing from the central focus mode. That is, the maximum blurriness over the whole area of the photographed image in the average focus mode, is smaller than that in the central focus mode.

When the average focus mode is selected, and field curvature data having a field curvature ratio with a plus value is used, the AF motor 27 moves the photographing lens 22 in a direction indicated by arrow B in FIG. 13, that is away from the imaging surface 34S, to the peripheral zoom position. The distance between the peripheral zoom position and the imaging surface 34S corresponds to the average field curvature ratio. As a result, the focused area spreads, the blurriness due to focusing at the peripheral area of photographed image is reduced, and there is no area where the focus is seriously out on the photographed image, similarly to the case when the field curvature ratio is a minus value in the average focus mode, as mentioned above.

In the digital single-lens reflex camera 10, a proportional focus mode where the focus position is adjusted based on proportional field curvature ratios being proportional to the average field curvature ratios, can be selected in addition to the central focus mode and the average focus mode. In the proportional focus mode, the digital signal processing circuit 38 calculates a proportional field curvature ratio, by multiplying the calculated average field curvature ratio and a predetermined coefficient of proportion. For example, when the field curvature data in FIG. 8(A) is used, and the coefficient of proportion is 0.5, the proportional field curvature ratio is calculated as being "−0.58(%)". In this case, the AF driving circuit 55 controls the AF motor 27 to make the photographing lens 22 shift in a direction indicated by arrow A in FIG. 12, to the peripheral zoom position, which is close to the imaging surface 34S and a distance corresponding to the 0.58(%) of the focal distance "f" of the photographing lens 22 apart from the standard zoom position.

The value of the coefficient of proportion is generally smaller than "1" and the proportional field curvature ratio is smaller than the average field curvature ratio, because it is usually preferable that the center area of the photographed image is in focus as opposed to the peripheral area of the photographed image is in focus. However, the value of the coefficient of proportion may be larger than 1. A plurality of proportional focus modes may be selectable by selecting a coefficient of proportion among various coefficients, or by inputting arbitrarily coefficient of proportion on the menu selection picture. Thus, in the proportional focus mode, the blurriness due to focusing at the periphery area of photographed image is reduced compared to the center focus mode, and the standard position for focusing can be adjusted to the peripheral zoom position or an other desirable position.

Note that the digital signal processing circuit 38 can calculate corrected field curvature data which is used for correcting the zoom position, by interpolation of the field curvature data, based on the zoom position data and the aperture position data, as mentioned above. For example, when the focal distance "f" represented by the zoom position data is 35 (mm), and the aperture value "F" represented by the aperture position data is 2, new field curvature data, that is corrected field curvature data, is calculated by the interpolation of the field curvature data for the focal distance "f" being 28 (mm) and the aperture value "F" being 2 in FIG. 7(A), and the other field curvature data for the focal distance "f" being 50 (mm) and the aperture value "F" being 2 in FIG. 7(B). In the interpolation, each value of the corrected field curvature data is calculated to be between the values of corresponding partial areas of the field curvature data in FIG. 7(A) and FIG. 7(B).

In the first embodiment mentioned above, the field curvature data unique to each lens are previously stored in the camera body 30, the focus position can be adjusted to be suitable, based on the field curvature data for the used lens, the focal distance, and the aperture value. Further, the focus error at the periphery area of photographed image, caused by the field curvature can be reduced and a desirable focus position can be set.

In the embodiment, a camera is not limited to a digital camera or a single-lens reflex camera. Therefore, as far as being an AF camera, the camera can be a conventional digital camera or a silver-halide film camera.

Figure 14:
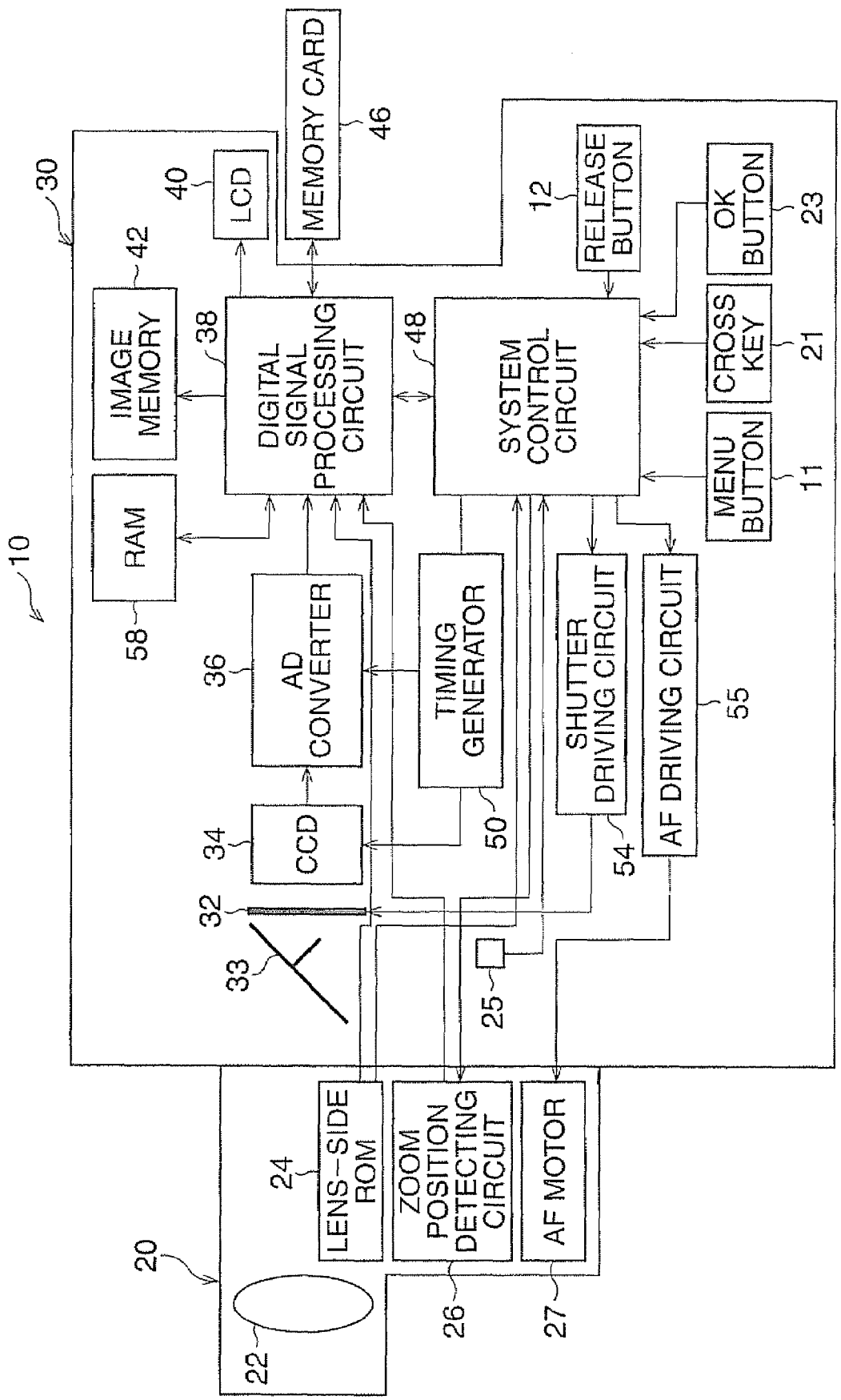
FIG. 14 is a block diagram of the digital single-lens reflex camera of the second embodiment.

FIG. 14 is a block diagram of the digital single-lens reflex camera 10 of the second embodiment.

In this embodiment, there are the following differences from the first embodiment. That is, the lens unit 20 can be attached to and used with a plurality of camera bodies including the camera body 30, and the field curvature data is stored in the lens unit 20, not in the camera body 30. The field curvature data is stored in the lens-side ROM 24 with the identification data, and the field curvature data is stored as a full data set in case the lens unit 20 is attached to a camera body which has an imaging device having the largest format size among the imaging devices included in the camera bodies which can be used with the lens unit 20.

The digital signal processing circuit 38 selectively reads a part of, or all of the field curvature data stored in the lens-side ROM 24 according to the format size of the CCD 34, and stores the read field curvature data in the RAM 58. Further, the digital signal processing circuit 38 calculates the corrected data according to need, based on the zoom position of the photographing lens 22 and the aperture position of the aperture, by interpolation of the field curvature data stored in the RAM 58. And then, the calculated corrected data is stored in the RAM 58, and is used for correction of a photographed image.

In this second embodiment, differing to the first embodiment, the digital signal processing circuit 38 reads only the field curvature data of the lens attached to the camera body 30, therefore, the identification data to identify the photographing lens is not necessarily required.

Figure 15:
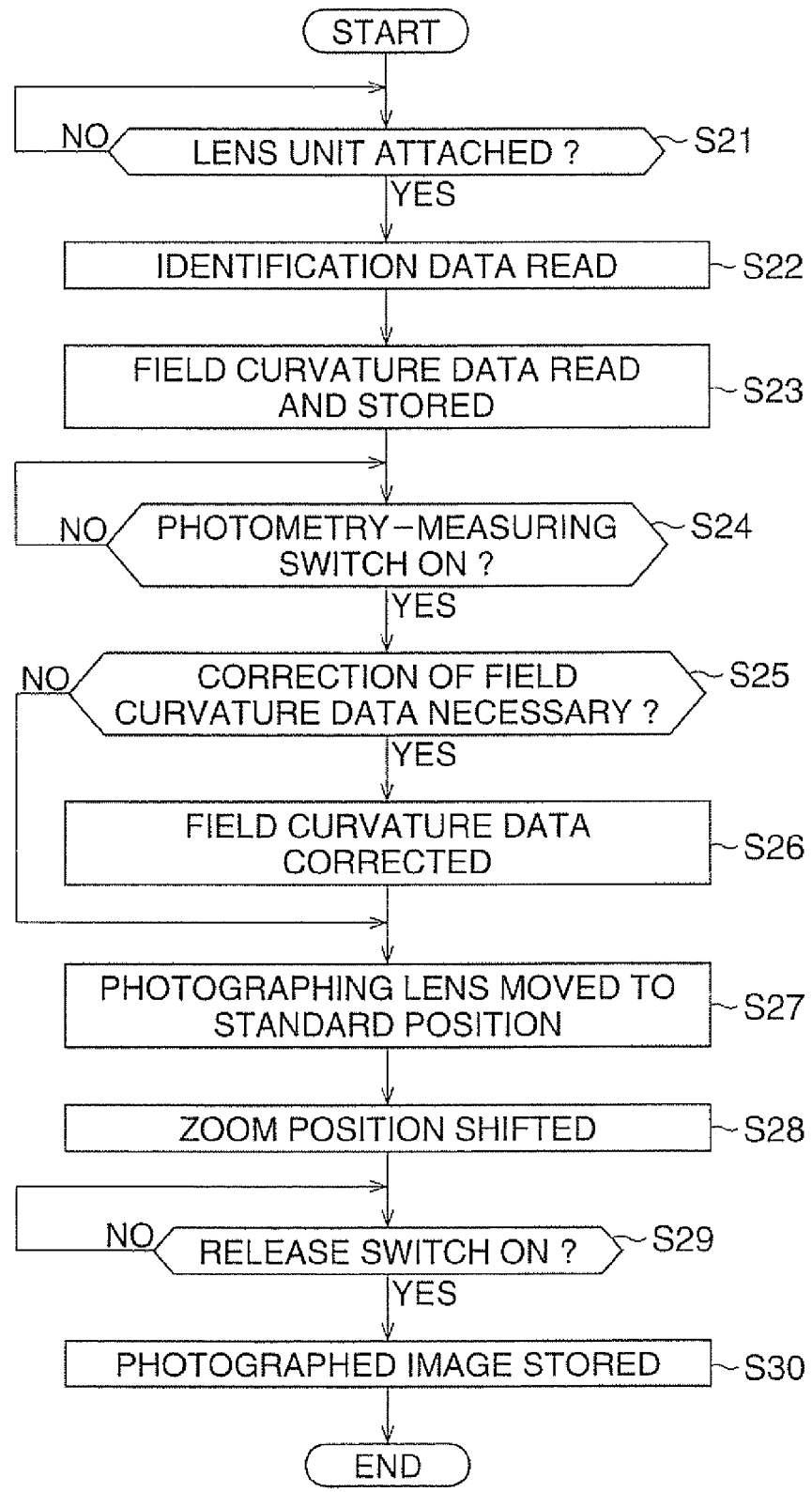
FIG. 15 is a flowchart representing a zoom position correction routine of the photographing lens of the second embodiment.

FIG. 15 is a flowchart representing a zoom position correction routine of the photographing lens 22 of the second embodiment.

The zoom position correction routine starts when a power switch (not shown) provided on the camera body 30 is turned on. At step S21, it is judged whether the lens unit 20 is attached to the camera body 30 or not. When it is judged that the lens unit 20 is attached to the camera body 30, the process proceeds to step S22. At step S22, the identification data of the photographing lens 22 is read by the system control circuit 48, and then the process proceeds to step S23. At step S23, a part of, or all of the field curvature data stored as a full data set in the lens-side ROM 24, is read by the digital signal processing circuit 38 according to the format size of the CCD 34, and the read field curvature data is stored in the RAM 58. After that, the process proceeds to step S24. At step S24, it is judged whether the release button 12 is half pressed and the photometry-measuring switch is turned on or not, and when it is judged that the photometry-measuring switch is turned on, the process proceeds to step S25.

At step S25, it is judged whether the correction of the field curvature data (interpolation process) stored as lookup tables is necessary or not, by the digital signal processing circuit 38. The judgment is carried out based on the focal distance of the photographing lens 22 and the aperture position, represented by the zoom position data and the aperture position data obtained by the digital signal processing circuit 38. When it is judged that the correction of the field curvature data is necessary, the process proceeds to step S26, and when it is judged that the correction of the field curvature data is not necessary, the process proceeds to step S27.

At step S26, the field curvature data is interpolated by the digital signal processing circuit 38, based on the zoom position data and the aperture position data, the corrected field curvature data to be used for adjusting the zoom position is calculated, and then the process proceeds to step S27.

At step S27, the AF motor 27 is controlled by the AF driving circuit 55, for making the photographing lens 22 move to the standard zoom position where the output of the AF sensor 25 is maximum, and then the process proceeds to step S28. At step S28, the zoom position of the photographing lens 22 is corrected from the standard position to a focus position by being shifted the required distance, based on the field curvature data, or the corrected field curvature data, and then the process proceeds to step S29.

At step S29, it is judged whether the release button 12 is fully depressed and a release switch is turned on or not, and when it is judged that the release switch is turned on, the process proceeds to step S30. At step S30, a subject is photographed, and an obtained image is stored in the memory card 46. And then, the zoom position correction routine ends.

In the second embodiment mentioned above, the full data set of the field curvature data which can be used with an imaging device having the largest format size of the imaging devices which can be used such as the CCD 34, is previously stored in the lens unit 20, the field curvature data is read according to the format size of the imaging device actually used, and the image is corrected with the field curvature data. Therefore, in the case where the lens unit 20 can be used with a plurality of camera bodies, the focus position can be suitably adjusted.

The first embodiment and the second embodiment can be combined. In this case, in the camera body 30, the field curvature data of a plurality of photographing lens are stored, the digital signal processing circuit 38 can partially read the full field curvature data set, according to the format size of the imaging device, and the full field curvature data set is stored in the lens unit 20. As a result of this, in the digital single-lens reflex camera 10 where one of a plurality of lens units and one of a plurality of camera bodies are selected and used as a pair, the focus position can be adjusted to reduce the image areas having large blurriness, due to focusing caused by the field curvature, regardless of the combinations of the lens and the camera bodies.

In the second embodiment, a camera is not limited to a digital single-lens reflex camera, as far as being an AF camera. Further, when the digital signal processing circuit 38 does not selectively read a part of the field curvature data, according to the format size of the imaging device, a camera in this second embodiment is not limited to a digital camera.

Figure 16:
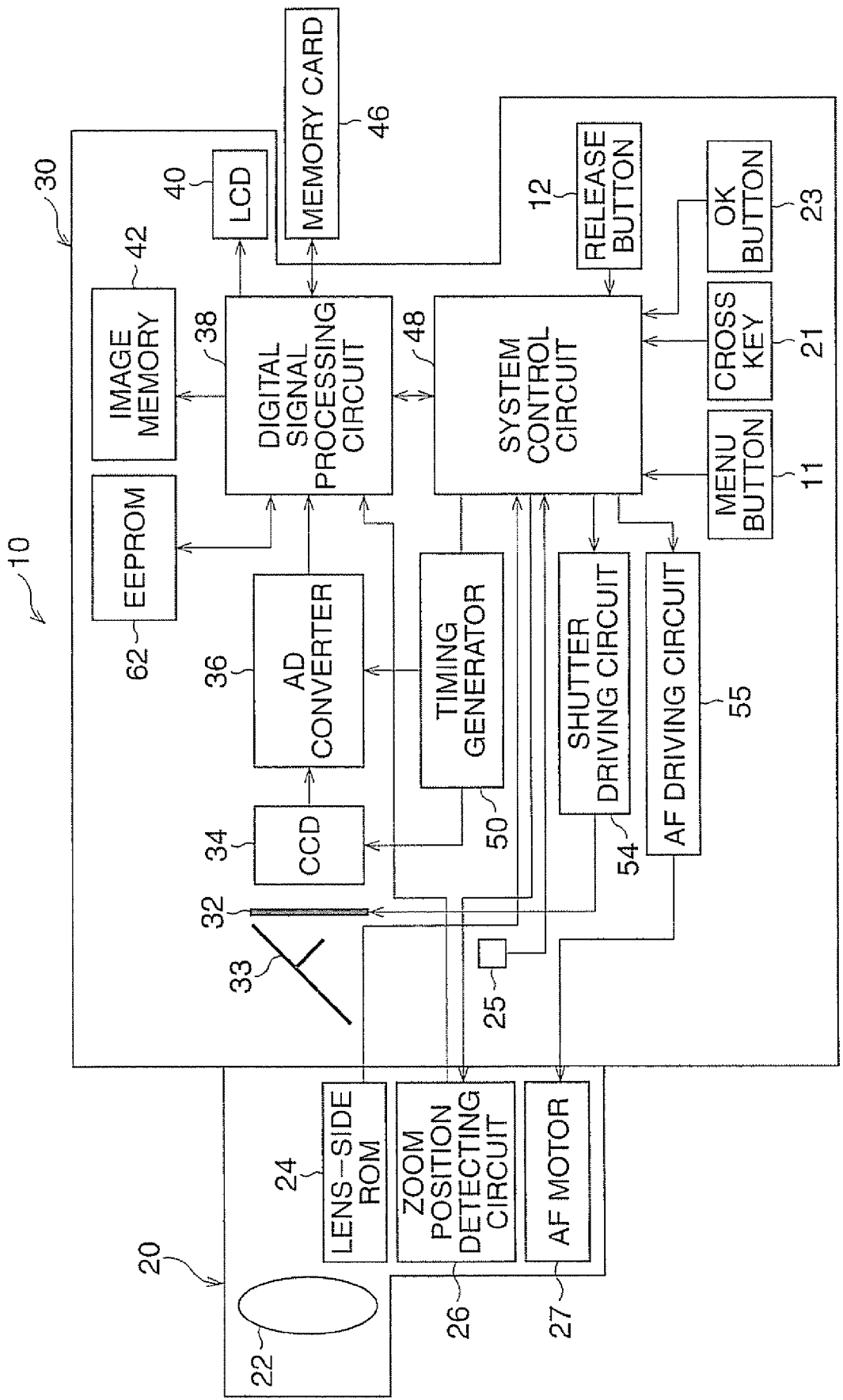
FIG. 16 is a block diagram of a digital single-lens reflex camera of the third embodiment.

FIG. 16 is a block diagram of the digital single-lens reflex camera 10 of the third embodiment.

In this embodiment, there are the following differences from the above-mentioned embodiments. That is, the field curvature data is stored in the memory card 46 which can be detachably attached to the camera body 30, and an EEPROM 62 is provided instead of the camera-side ROM 56 and RAM 58. The field curvature data is read by the digital signal processing circuit 38 from the memory card 46, and stored in the EEPROM 62. The digital signal processing circuit 38 selectively reads the field curvature data of the photographing lens 22 currently used, among the field curvature data stored in the EEPROM 62, based on the identification data of the photographing lens 22. And then, the read field curvature data is used for adjusting the zoom position.

In the third embodiment, the EEPROM 62 is not necessarily provided. When the EEPROM 62 is not provided, the digital signal processing circuit 38 selectively reads only field curvature data for the photographing lens being used, that is, the photographing lens 22 here, from the memory card 46, based on the identification data.

In the third embodiment mentioned above, the camera-side ROM 56 and so on, which require a large capacity for storing all the field curvature data of the photographing lens which may be used, are not necessary. This can be done by storing only the required field curvature data, that is the field curvature data of the photographing lens being actually used such as the photographing lens 22, in the memory card 46. Further, the field curvature data can be stored in the memory card 46 by down loading via computer lines, therefore, the required field curvature data can become easily available to users.

The second embodiment and the third embodiment can be combined. In this case, the digital signal processing circuit 38 can selectively read a part of the full field curvature data set according to the format size of the imaging device, and the full field curvature data set is stored in the memory card 46. As a result of this, similarly to combining the first and the second embodiments, in the digital single-lens reflex camera 10 where one of a plurality of lens units and one of a plurality of camera bodies are selected and used as a pair, the focus position is adjustable according to the combination of the lens unit and the camera body.

In this embodiment, a camera is not limited to a single-lens reflex camera, as long as it is an AF camera, similarly to the other embodiments.

Finally, it will be understood by those skilled in the art that the foregoing description is of preferred embodiments of the apparatus, and that various changes and modifications may be made to the present invention without departing from the spirit and scope thereof.

The present disclosure relates to subject matter contained in Japanese Patent Application No. 2005-000764 (filed on Jan. 5, 2005) which is expressly incorporated herein, by reference, in its entirety.

The invention claimed is:

1. A focusing controlling device of a camera having a photographing lens and an imaging sensor with a flat imaging surface, comprising:
a focus adjuster that adjusts a focus position of said photographing lens based on field curvature data, said field curvature data indicating a field curvature ratio which is a ratio of a differential distance in a direction perpendicular to the flat imaging surface between an image point of light at a focus surface transmitted through said photographing lens and said flat imaging surface, to a focal distance of said photographing lens, said field curvature data being set for a partial area of said flat imaging surface as an average value of said field curvature ratios for said partial area.

2. The focusing controlling device according to claim 1, further comprising, an average data calculator that calculates an average field curvature data indicating an average field curvature ratio which is an average value of said field curvature ratios for a plurality of said partial areas;
wherein said focus adjuster can adjust a focus position of said photographing lens based on said average field curvature data.

3. The focusing controlling device according to claim 2, further comprising, a mode selector that selects one of an average focus mode where said focus adjuster adjusts a focus position of said photographing lens based on said average field curvature data, and a central focus mode where said focus adjuster adjusts a focus position of said photographing lens based on said field curvature data for said partial area located in the center of said flat imaging surface.

4. The focusing controlling device according to claim 3, further comprising, a proportional data calculator that calculates proportional field curvature data indicating a proportional field curvature ratio that is proportional to said average field curvature ratio;
wherein said mode selector can select a proportional focus mode where said focus adjuster adjusts a focus position of said photographing lens based on said proportional field curvature data, in addition to said average focus mode and said central focus mode.

5. The focusing controlling device according to claim 4, wherein an absolute value of said proportional field curvature ratio is smaller than an absolute value of said average field curvature ratio.

6. The focusing controlling device according to claim 3, wherein said mode selector is a switch.

7. The focusing controlling device according to claim 2, wherein said average field curvature ratio is an average value of said field curvature ratios for all of said flat imaging surface.

8. The focusing controlling device according to claim 1, wherein said partial areas divide said flat imaging surface equally.

9. The focusing controlling device according to claim 1, wherein said field curvature data is stored as a lookup table.

10. The focusing controlling device according to claim 9, further comprising, a field curvature data calculator that calculates new field curvature data as corrected field curvature data by interpolation of said field curvature data.

11. The focusing controlling device according to claim 1, wherein said field curvature data is set for said focal distance of said photographing lens.

12. The focusing controlling device according to claim 1, wherein said camera further comprises an aperture for adjusting an amount of light transmitted through said imaging device, and said field curvature data is set for an aperture value of said aperture.

13. A camera, comprising:
a photographing lens;
an imaging sensor with a flat imaging surface; and
a focus adjuster that adjusts a focus position of said photographing lens based on field curvature data, said field curvature data indicating a field curvature ratio which is a ratio of a differential distance in a direction perpendicular to the flat imaging surface between an image point of light at a focus surface transmitted through said photographing lens and said flat imaging surface, to a focal distance of said photographing lens, said field curvature data being set for a partial area of said flat imaging surface as an average value of said field curvature ratios for said partial area.

14. The camera according to claim 13, wherein said camera is a digital single-lens reflex camera comprising a camera body and a lens unit detachably attached to said camera body, said lens unit has said photographing lens, and an identification data memory for storing identification data to identify said photographing lens, said camera body has said flat imaging surface, a field curvature data memory for storing said field curvature data unique to said photographing lens, a field curvature data reader that reads said field curvature data based on said identification data, and said focus adjuster.

15. The camera according to claim 13, wherein said camera is a digital single-lens reflex camera comprising a camera body and a lens unit detachably attached to said camera body, said lens unit has said photographing lens, and a field curvature data memory for storing said field curvature data unique to said photographing lens, said camera body has said flat imaging surface, a field curvature data reader that reads said field curvature data based on said identification data, and said focus adjuster.

16. The camera according to claim 15, wherein said camera body also has an imaging device having said flat imaging surface, said field curvature data reader being able to selectively read a part of said field curvature data according to a format size of said imaging device.

17. The camera according to claim 13, wherein said camera is a digital single-lens reflex camera comprising a camera body and a lens unit detachably attached to said camera body, and a storage medium which can be attached to said camera, said lens unit has said photographing lens, and an identification data memory for storing identification data to identify said photographing lens, said storage medium has a field curvature data memory for storing said field curvature data unique to said photographing lens, and said camera body has said flat imaging surface, a field curvature data reader that reads said field curvature data based on said identification data, and said focus adjuster.

18. A photographing lens focus position adjusting method, comprising:
calculating field curvature data indicating a field curvature ratio which is a ratio, of a differential distance in a direction perpendicular to a flat imaging surface of an imaging sensor between an image point of light transmitted through said photographing lens and said flat imaging surface, to a focal distance of said photographing lens, and which is set for a partial area of said flat imaging surface, by averaging said field curvature ratios for said partial area; and adjusting a focus position of said photographing lens based on said field curvature data.

19. The focusing controlling device according to claim 1, wherein said focus adjuster adjusts the focus position of said photographing lens based on either an average field curvature data indicating an average of field curvature ratios for a plurality of said partial areas, or on a field curvature data for a field curvature ratio for one partial area located at a predetermined position of said flat imaging surface.

20. The camera according to claim 13, wherein said focus adjuster adjusts the focus position of said photographing lens based on either an average field curvature data indicating an average of field curvature ratios for a plurality of said partial areas, or on a field curvature data for a field curvature ratio for one partial area located at a predetermined position of said flat imaging surface.

21. The photographing lens focus position adjusting method according to claim 18, wherein the focus position of said photographing lens is adjusted based on either an average field curvature data indicating an average of field curvature ratios for a plurality of said partial areas, or on a field curvature data for a field curvature ratio for one partial area located at a predetermined position of said flat imaging surface.

* * * * *